Figure 1:
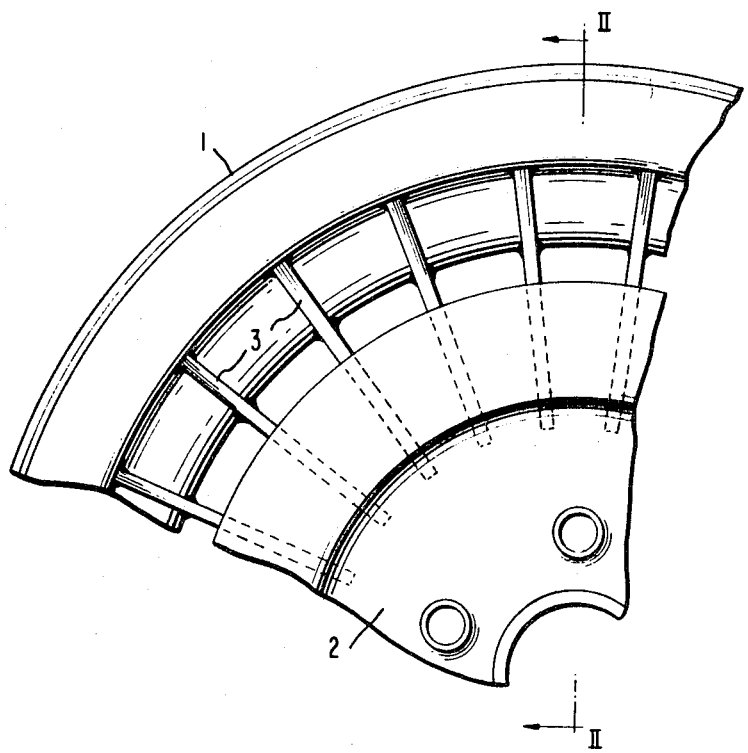

United States Patent

[11] 3,623,774

[72] Inventors Gunter Funke
 Deufringen (Wurtt);
 Manfred H. Burckhardt, Waiblingen, both of Germany
[21] Appl. No. 825,159
[22] Filed May 16, 1969
[45] Patented Nov. 30, 1971
[73] Assignee Daimler-Benz Aktiengesellschaft
 Stuttgart-Unterturkheim, Germany
[32] Priority May 18, 1968
[33] Germany
[31] P 17 55 523.6

[54] WHEEL, ESPECIALLY FOR MOTOR VEHICLES
 4 Claims, 2 Drawing Figs.
[52] U.S. Cl..................................................... 301/64 R,
 301/6 CS
[51] Int. Cl..................................................... B60b 1/10

[50] Field of Search......................................... 301/6 CS, 64

[56] References Cited
UNITED STATES PATENTS
2,687,192  8/1954  Butterfield .................. 301/6 X CS
2,740,502  4/1956  Butterfield .................. 301/6 UX
FOREIGN PATENTS
277,673  9/1930  Italy ............................ 301/64

Primary Examiner—Richard J. Johnson
Attorney—Craig, Antonelli & Hill

ABSTRACT: A wheel, especially for motor vehicles, in which the wheel dish is connected with the wheel rim by connecting ribs constructed as blades in such a manner that upon rotation of the wheel, when driving in the normal forward direction, air is supplied from the inside toward the outside of the wheel.

PATENTED NOV 30 1971

3,623,774

INVENTORS
GUNTER FUNKE
MANFRED H BURCKHARDT

BY
Craig, Antonelli, Stewart & Hill ATTORNEYS

WHEEL, ESPECIALLY FOR MOTOR VEHICLES

The present invention relates to a wheel, especially for motor vehicles which is so constructed that a completely satisfactory ventilation or cooling of a brake arranged within the area of the wheel is assured.

It is known that the brakes, especially of high-power motor vehicles, have to be so arranged that an adequate cooling thereof takes place by the air sweeping past the same.

Consequently, wheels have already been proposed in the prior art which are provided with different types of apertures or openings in order to enable a passage of air through the wheels.

Furthermore, for wheels provided with apertures, wheel caps have also been proposed already which are provided with bladelike embossments by means of which air supply is to be achieved for the cooling of the brakes.

However, the disadvantages of the wheels known heretofore essentially consist in that either essentially only an air turbulence and no well-defined airflow is achieved or in that, in the event such a defined airflow exists, this airflow is directed from the outside toward the inside by reason of the configuration of the wheels. This means, however, that with such types of prior art wheels, the flow has to work against the dynamic or ram pressure forming during the drive below the vehicle whereby the effectively supplied air quantity is naturally reduced strongly.

The present invention is therefore concerned with creating a wheel especially for motor vehicles which for the elimination of the aforementioned disadvantages produced a strong airflow, well defined in its direction, for the cooling of a brake arranged within its area.

Accordingly, a wheel, especially for motor vehicles, consisting of rim, wheel dish, and connecting ribs is proposed, whereby according to the present invention, the ribs extending from the wheel dish to the wheel rim are constructed only as thin blades in the manner of a radial blower which—as viewed with the wheel assembled—supplies or feeds from the inside toward the outside.

Consequently, the present invention embraces the general concept to establish the supporting connection between wheel dish and rim by blades and to construct the same, for the reasons explained above, corresponding to the special inventive concept in the manner of the blading of a radial blower which feeds from the inside toward the outside.

The wheel constructed in accordance with the present invention offers the advantage that the supporting elements of the wheel can be utilized by reason of their special construction at the same time and without additional measures for the production of a cooling airstream for the brakes. By reason of the proposed special construction, this cooling airstream acts no longer—as in the customary, prior art types of constructions—against the excess pressure prevailing inwardly under the vehicle but instead in the same direction. Consequently, a flow completely well defined in its direction results which supplies in all driving conditions of interests such a large air quantity that a sufficient heat quantity is removed from the brakes.

According to a preferred type of construction of the present invention, the outer portion of the wheel dish is extended far in the direction toward the rim. As a result of the extended abutment surfaces for the blades, created thereby, the wheel receives a high strength. Additionally, the formation of a well-defined, directed airstream is favorably influenced by such a measure.

It is furthermore advantageous if the number of blades is divisible by the number of fastening screws or studs of the wheel. It is achieved thereby that the blades are located in each case on both sides of a hole for a fastening screw which leads to a uniform rigidity and again increases the strength of the wheel.

Finally, it is advantageous if the blades—as viewed in front view—occupy at the most 30 percent of the annular surface between wheel dish and rim. This is so as exhaustive tests have indicated that upon fulfilling this condition a particularly intensive air feed through the wheel takes place because the passage of the air is not throttled. Any further reduction of the free area entails throttle losses.

Accordingly, it is an object of the present invention to provide a wheel for motor vehicles which avoids by simple means the aforementioned shortcomings and drawbacks encountered in the prior art constructions.

Another object of the present invention resides in a wheel, especially for motor vehicles, which assures adequate cooling of the brake associated with the wheel under all relevant driving conditions.

A further object of the present invention resides in a wheel, especially for motor vehicles, which produces a well-defined, unequivocal flow of air, utilizing in an optimum manner the pressure conditions prevailing during the drive of the vehicle.

Another object of the present invention resides in a wheel, especially for motor vehicles, which fulfills all of the aforementioned aims and objects without sacrifice in strength of the wheel.

Figure 2:
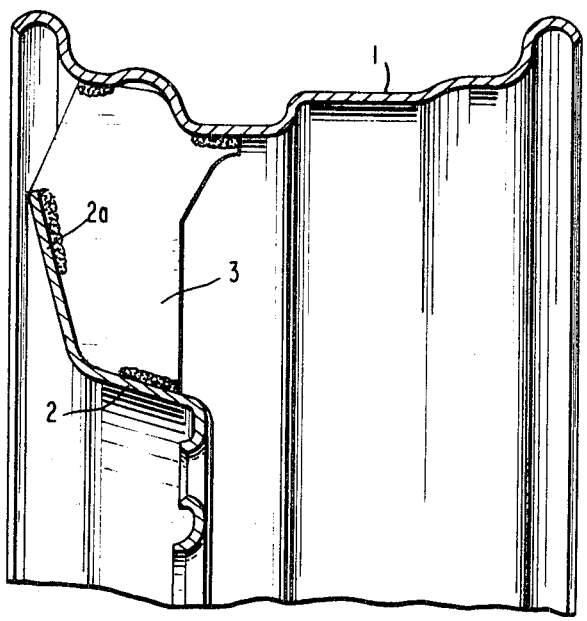

These and further objects, features, and advantages of the present invention will become more obvious from the following description when taken in connection with the accompanying drawing which shows, for purposes of illustration only, one embodiment in accordance with the present invention, and wherein:

FIG. 1 is a partial front view of a welded wheel in accordance with the present invention; and FIG. 2 is a partial cross-sectional view taken along line II—II of FIG. 1.

Referring now to the drawing wherein like reference numerals are used throughout the two views to designate like parts, the connection between rim 1 and wheel dish 2 takes place by sheet metal plates 3 acting as blades which are arranged radially and are welded together with the rim 1 and the wheel dish 2. The area occupied by the spaced blades 3, as viewed in front view of the wheel, amounts to at most 30 percent of the annular space between wheel dish 2 and rim 1.

The entire wheel acts thereby as radial blower and produces a well-defined flow directed from the inside to the outside.

While we have shown and described only one embodiment in accordance with the present invention, it is understood that the same is not limited thereto but is susceptible of numerous changes and modifications as known to a person skilled in the art. For example, in lieu of a welded wheel, the wheel can be advantageously forged or cast, for example, of aluminum. Consequently, we do not wish to be limited to the details shown and described herein but intend to cover all such changes and modifications as are within the scope of those skilled in the art.

We claim:

1. A wheel for motor vehicles, comprising a wheel rim with a drop center of reduced diameter, a wheel dish having a central portion with bolt apertures positioned in the zone of the drop center and coextensive peripheral portions directed axially outwardly and radially outwardly from the central portion, respectively, the radially outwardly extending portion being in proximity to the periphery of the wheel rim and the axially outwardly extending portion being in proximity to the drop center so as to form a generally radially outwardly directed annular passage therebetween, and connecting ribs extending from the wheel dish to the rim, said ribs being secured to the rim and to the dish and having a width substantially equal to the axial length of said annular passage, said ribs being formed as thin blades which function as a radial blower which feeds air from the inside of the wheel toward the outside of the wheel through said annular passage with the air inlet being in the zone of reduced diameter of the rim and the air outlet being in the zone of the larger diameter periphery of the rim.

2. A wheel according to claim 1, characterized in that the connecting ribs, as viewed in front view, occupy at most about 30 percent of the annular surface between wheel dish and rim.

3. A wheel according to claim 1, characterized in that the number of connecting ribs is divisible by the number of fastening screws of the wheel.

4. A wheel according to claim 3, characterized in that the connecting ribs, as viewed in front view, occupy at most about 30 percent of the annular surface between wheel dish and rim.

* * * * *